US012794242B2

(12) United States Patent
Okamoto et al.

(10) Patent No.: US 12,794,242 B2
(45) Date of Patent: Nov. 10, 2026

(54) VEHICLE POWER SUPPLY DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takahiro Okamoto, Osaka (JP); Hiroki Shimoda, Osaka (JP); Taiji Yanagida, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 19/128,617

(22) PCT Filed: Nov. 8, 2023

(86) PCT No.: PCT/JP2023/040162

§ 371 (c)(1),
(2) Date: May 9, 2025

(87) PCT Pub. No.: WO2024/116754

PCT Pub. Date: Jun. 6, 2024

(65) Prior Publication Data

US 2026/0081432 A1 Mar. 19, 2026

(30) Foreign Application Priority Data

Nov. 29, 2022 (JP) ................................ 2022-190240

(51) Int. Cl.
*B60L 9/18* (2006.01)
*B60L 15/00* (2006.01)
(Continued)

(52) U.S. Cl.
CPC ................ *H02J 7/345* (2013.01); *B60L 9/18* (2013.01); *B60L 15/007* (2013.01); *B60L 50/40* (2019.02);
(Continued)

(58) Field of Classification Search
CPC ...... B60L 1/00; B60L 3/00; B60L 9/18; B60L 15/007; B60L 50/51; B60L 50/60;
(Continued)

(56) References Cited

U.S. PATENT DOCUMENTS

2010/0038962 A1* 2/2010 Komatsu ............. H02M 5/4585 307/10.1
2012/0123625 A1* 5/2012 Ueo ........................ B60L 50/16 701/22

(Continued)

FOREIGN PATENT DOCUMENTS

JP 2008-86136 A 4/2008
JP 2022-87465 A 6/2022

(Continued)

OTHER PUBLICATIONS

International Search Report issued in WIPO Patent Application No. PCT/JP2023/040162, dated Dec. 19, 2023, along with an English translation thereof.

*Primary Examiner* — Levi Gannon
(74) *Attorney, Agent, or Firm* — Greenblum & Bernstein, P.L.C.

(57) ABSTRACT

A vehicle power supply device includes a first relay (e.g., first positive-electrode side relay), and a second relay (e.g., second positive-electrode side relay), and a DC-DC con-
(Continued)

verter. The DC-DC converter is provided between a first conductive path (e.g., first positive-electrode side conductive line), which is an electrical path between the first relay and a first capacitor in a first branch path, and a low-voltage battery, and steps down a voltage inputted from the first conductive path (e.g., first positive-electrode side conductive line) and outputs the voltage to the low-voltage battery The DC-DC converter is provided between a second conductive path (e.g., second positive-electrode side conductive line), which is an electrical path between the second relay and a second capacitor in a second branch path, and the low-voltage battery, and supplies electric power to the second capacitor by performing voltage boosting operation of boosting the voltage inputted from the low-voltage battery.

4 Claims, 7 Drawing Sheets

(51) Int. Cl.

| | |
|---|---|
| ***B60L 50/40*** | (2019.01) |
| ***B60L 50/51*** | (2019.01) |
| ***B60L 50/60*** | (2019.01) |
| ***B60L 50/64*** | (2019.01) |
| ***B60L 53/22*** | (2019.01) |
| ***B60L 55/00*** | (2019.01) |
| ***B60L 58/20*** | (2019.01) |
| ***H02J 7/34*** | (2006.01) |
| *B60L 1/00* | (2006.01) |

(52) U.S. Cl.
CPC ............... *B60L 50/51* (2019.02); *B60L 50/60* (2019.02); *B60L 50/64* (2019.02); *B60L 53/22* (2019.02); *B60L 55/00* (2019.02); *B60L 58/20* (2019.02); *B60L 1/00* (2013.01); *B60L 2210/14* (2013.01); *B60L 2270/20* (2013.01)

(58) Field of Classification Search
CPC .......... B60L 50/61; B60L 50/64; B60L 53/14; B60L 53/22; B60L 55/00; B60L 58/10; B60L 58/18; B60L 58/20; B60L 58/22; B60L 2210/10; B60L 2210/12; B60L 2210/14; B60L 2270/20; H02J 7/345
See application file for complete search history.

(56) References Cited

U.S. PATENT DOCUMENTS

| | | | | |
|---|---|---|---|---|
| 2013/0268158 | A1* | 10/2013 | Kurita ........................ | B60L 3/00 701/32.8 |
| 2014/0132226 | A1* | 5/2014 | Sakamoto ............. | B60L 3/0046 320/166 |
| 2014/0159478 | A1* | 6/2014 | Ang ........................ | B60L 8/003 307/9.1 |
| 2015/0291111 | A1 | 10/2015 | Suzuki et al. | |
| 2016/0016479 | A1* | 1/2016 | Khaligh .............. | H02M 1/4258 336/170 |
| 2018/0361861 | A1* | 12/2018 | Bando ...................... | B60L 53/14 |
| 2021/0155100 | A1* | 5/2021 | Khaligh .................. | B60L 55/00 |

FOREIGN PATENT DOCUMENTS

| | | | |
|---|---|---|---|
| JP | 2022-88893 | A | 6/2022 |
| WO | 2014/103707 | A1 | 7/2014 |

* cited by examiner

VEHICLE POWER SUPPLY DEVICE

TECHNICAL FIELD

The present disclosure relates to a vehicle power supply device.

BACKGROUND ART

Patent Document 1 discloses a drive battery composed of a battery module. The drive battery supplies high-voltage DC power to a micro control unit (MCU) inverter via a high voltage line provided with a main contactor. The MCU inverter supplies AC drive power to a motor.

Also, high-voltage electric power is supplied from an external charging device to the drive battery via a quick charging high voltage line. A quick charging contactor is provided on the quick charging high-voltage line.

With the configuration of Patent Document 1, by switching the quick charging contactor to an on state, charging from the external charging device is possible without switching the main contactor to the on-state. This can suppress the deterioration of the main contactor.

CITATION LIST

Patent Document

Patent Document 1: International Patent Publication No. 2014/103707

SUMMARY OF INVENTION

Technical Problem

When the contactor is switched to the on-state while a potential difference occurs between both ends thereof, an inrush current is generated and the contactor deteriorates. Accordingly, in the configuration of Patent Document 1, when the quick charging contactor is switched to the on-state, there is a concern that an inrush current is generated in the quick charging contactor and that the quick charging contactor may be deteriorated. Such a problem also occurs in another configuration in which a relay is provided on an electric power path different from an electric power path to a motor for travelling.

It is an object of the present disclosure to provide a technique that can easily suppress the deterioration of a relay provided on an electric power path different from an electric power path to a motor for travelling.

Solution to Problem

A vehicle power supply device according to the present disclosure is a vehicle power supply device used in a vehicle power supply system, including:

a high voltage battery, a common path through which electric power is supplied from the high voltage battery, a first branch path that branches from the common path, a motor for travelling to which electric power is supplied with the high-voltage battery via the first branch path, an electric power conversion unit connected to the first branch path and converting electric power between the high-voltage battery and the motor, a first capacitor connected to the first branch path on a side of the high-voltage battery relative to the electric power conversion unit, a second branch path that branches from the common path, a transfer unit connected to the second branch path and configured to transfer electric power to and from the high-voltage battery, a second capacitor connected to the second branch path on the side of the high-voltage battery relative to the transfer unit, and a low-voltage battery, further including:

a first relay provided in the first branch path on the side of the high voltage battery relative to the first capacitor;

a second relay provided in the second branch path on the side of the high-voltage battery relative to the second capacitor; and a DC-DC converter, wherein the DC-DC converter is provided between a first conductive path, which is an electrical path between the first relay and the first capacitor in the first branch path, and the low-voltage battery, is configured to step down a voltage inputted from the first conductive path and to output the voltage to the low-voltage battery, is provided between a second conductive path, which is an electrical path between the second relay and the second capacitor in the second branch path, and the low-voltage battery, and is configured to supply electric power to the second capacitor by performing a voltage boosting operation of boosting the voltage inputted from the low-voltage battery.

Advantageous Effects of Invention

The technique according to the present disclosure can easily suppress the deterioration of the relay provided on the electric power path different from the electric power path to the motor for travelling.

DESCRIPTION OF EMBODIMENTS

Figure 1:
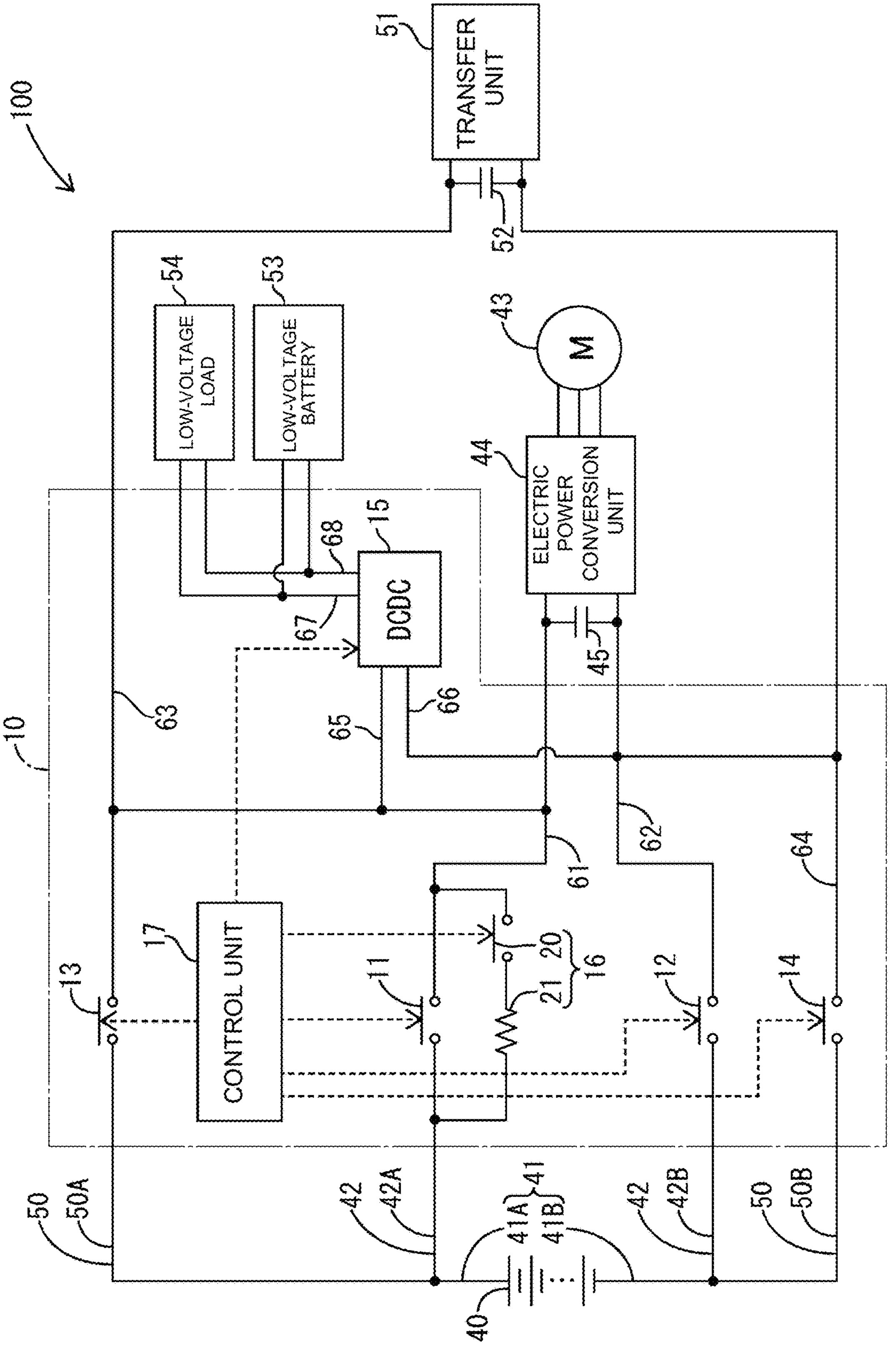
FIG. 1 is a circuit diagram schematically showing a vehicle power supply system including a vehicle power supply device according to a first embodiment.

Hereinafter, embodiments of the present disclosure will be listed and described.

(1) A vehicle power supply device according to the present disclosure is a vehicle power supply device used in a vehicle power supply system, including a high-voltage battery, a common path through which electric power is supplied from the high-voltage battery, a first branch path that branches from the common path, a motor for travelling to which electric power is supplied with the high-voltage battery via the first branch path, an electric power conversion unit connected to the first branch path and converting electric power between the high-voltage battery and the motor, a first capacitor connected to the first branch path on a side of the high-voltage battery relative to the electric power conversion unit, a second branch path that branches from the common path, a transfer unit connected to the second branch path and configured to transfer electric power to and from the high-voltage battery, a second capacitor connected to the second branch path on the side of the high-voltage battery relative to the transfer unit, and a low voltage battery, further including:

a first relay provided in the first branch path on the side of the high-voltage battery relative to the first capacitor, a second relay provided in the second branch path on the side of the high-voltage battery relative to the second capacitor, and a DC-DC converter, the DC-DC converter being provided between a first conductive path, which is an electrical path between the first relay and the first capacitor in the first branch path, and the low voltage battery, stepping down a voltage inputted from the first conductive path and outputting the voltage to the low-voltage battery, being provided between a second conductive path, which is an electrical path between the second relay and the second capacitor in the second branch path, and the low-voltage battery, and supplying electric power to the second capacitor by performing voltage boosting operation of boosting the voltage inputted from the low-voltage battery.

In this vehicle power supply device, the second relay is switched to the on-state, whereby electric power can be transferred between the high-voltage battery and the transfer unit without switching the first relay to the on-state. This can suppress deterioration of the first relay caused by switching the first relay to the on-state. Furthermore, this vehicle power supply device can pre-charge the second capacitor with use of the DC-DC converter for charging the low-voltage battery. Accordingly, this vehicle power supply device can suppress an inrush current generated when the second relay is switched to the on-state, and can suppress the deterioration of the second relay. That is, this vehicle power supply device can easily suppress the deterioration of the second relay provided on the electric power path different from the electric power path to the motor for travelling.

(2) The vehicle power supply device described in (1), in which the DC-DC converter described above is configured to apply voltage, boosted in the voltage boosting operation, to a high-voltage side conductive path, and the high-voltage side conductive path is connected to the first conductive path via a third conductive path and is connected to the second conductive path via a fourth conductive path, and the vehicle power supply device further includes a switch provided on the third conductive path.

This vehicle power supply device can supply electric power from the high-voltage battery to the low-voltage battery via the third conductive path and the DC-DC converter when the switch is in the on-state. Moreover, this vehicle power supply device can prevent supply of electric power from the DC-DC converter to the first conductive path by keeping the switch in the off-state when electric power is supplied from the DC-DC converter to the second capacitor via the fourth conductive path. Accordingly, this vehicle power supply device can prevent consumption of the electric power from the DC-DC converter by the first capacitor when the second capacitor is pre charged, and can avoid leading to a delay in a charging speed of the second capacitor.

(3) The vehicle power supply device described in (2), including a second switch provided on the fourth conductive path, in which when the DC-DC converter performs the voltage boosting operation while the switch is in an on-state and the second switch is in an off-state, electric power from the DC-DC converter is supplied only to the first capacitor out of the first capacitor and the second capacitor, and when the DC-DC converter performs the voltage boosting operation while the switch is in an off-state and the second switch is in an on-state, electric power from the DC-DC converter is supplied only to the second capacitor out of the first capacitor and the second capacitor.

This vehicle power supply device can supply electric power from the DC-DC converter to the first capacitor or the second capacitor selectively.

(4) The vehicle power supply device described in (3), including a control unit configured to control the first relay, the second relay, the switch, the second switch, and the DC-DC converter, in which when a condition for pre-charging both the first capacitor and the second capacitor is satisfied, the control unit causes the DC-DC converter to perform the voltage boosting operation while controlling the switch to be in the on-state and controlling the second switch to be in the off-state, thereby pre-charging the first capacitor, causes the DC-DC converter to perform the voltage boosting operation by switching the first relay to an on state after pre-charging the first capacitor and switching the second switch to the on-state after switching the first relay to the on-state, thereby pre-charging the second capacitor, and then switches the second relay to an on-state after the second capacitor is pre-charged.

This vehicle power supply device can give priority to the pre-charging of the first capacitor when the condition for pre-charging both the first capacitor and the second capacitor is satisfied. Accordingly, this vehicle power supply device can easily start electric power supply via the first branch path earlier, and can also easily start driving of the motor earlier.

(5) The vehicle power supply device according to any one of (1) to (3), including a control unit configured to control the DC-DC converter, in which when a condition for pre-charging both the first capacitor and the second capacitor is satisfied, the control unit causes the DC-DC converter to perform the voltage boosting operation to pre-charge both the first capacitor and the second capacitor simultaneously.

This vehicle power supply device can pre-charge both the first capacitor and the second capacitor simultaneously with use of the DC-DC converter for charging the low-voltage battery when the condition for pre-charging both the first capacitor and the second capacitor is satisfied.

(6) The vehicle power supply device according to any one of (1) to (5), including a pre-charge circuit having an arrangement in which a pre-charge relay and a resistor are connected in series, in which the pre-charge circuit is provided in parallel only with the first relay out of the first relay and the second relay, and pre-charges the first capacitor in accordance with electric power from the high-voltage battery when the pre-charge relay is in an on-state.

This vehicle power supply device can pre-charge the first capacitor more rapidly compared with pre-charge by the DC-DC converter by switching the pre-charge relay to the on-state. Moreover, this vehicle power supply device can pre-charge the second capacitor with use of the DC-DC converter without providing the pre-charge circuit for the second relay.

First Embodiment

1. Configuration of Vehicle Power Supply System 100

FIG. 1 shows a vehicle power supply system 100 including a vehicle power supply device 10. The vehicle power supply system 100 is used in a vehicle not shown. The vehicle may be an electric vehicle, a fuel cell vehicle, or a hybrid vehicle.

The vehicle power supply system 100 includes a high voltage battery 40, a common path 41, a first branch path 42, a motor 43 for travelling, an electric power conversion unit 44, and a first capacitor 45.

The high-voltage battery 40 may be a lithium ion battery, a lead battery, or other battery. A voltage of the high-voltage battery 40 in full charge may be, for example, 400 V, 800 V, or other voltage.

The common path 41 is an electrical path to which electric power from the high-voltage battery 40 is supplied. The common path 41 is connected to the high-voltage battery 40. The common path 41 includes a positive-electrode side common line 41A and a negative-electrode side common line 41B. The positive-electrode side common line 41A is connected to a positive electrode of the high-voltage battery 40. The negative-electrode side common line 41B is connected to a negative electrode of the high-voltage battery 40. The negative-electrode side common line 41B is connected to a ground, which is not shown. The high voltage battery 40 applies an output voltage to the common path 41 (more specifically, positive-electrode side common line 41A). Here in the present specification, the voltage is a voltage with reference to potential of the negative-electrode side common line 41B and a voltage with reference to potential of the ground.

The first branch path 42 is an electrical path branched from the common path 41. The first branch path 42 includes a first positive-electrode side branch line 42A branched from the positive-electrode side common line 41A, and a first negative-electrode side branch line 42B branched from the negative-electrode side common line 41B.

The electric power conversion unit 44 is connected to the first branch path 42. The electric power conversion unit 44 converts electric power between the high-voltage battery 40 and the motor 43. In the present embodiment, the electric power conversion unit 44 has a function of converting DC power, supplied from a side of the high-voltage battery 40, into AC power and supplying the AC power to the motor 43. The electric power conversion unit 44 corresponds to an inverter in the present embodiment.

The first capacitor 45 is connected to the first branch path 42 on the side of the high-voltage battery 40 relative to the electric power conversion unit 44. One end of the first capacitor 45 is connected to the first positive-electrode side branch line 42A, and the other end of the first capacitor 45 is connected to the first negative-electrode side branch line 42B. The first capacitor 45 functions as a smoothing capacitor for smoothing the voltage applied to the first branch path 42 between the high-voltage battery 40 and the electric power conversion unit 44.

The vehicle power supply system 100 includes a second branch path 50, a transfer unit 51, a second capacitor 52, a low-voltage battery 53, and a low-voltage load 54.

The second branch path 50 is an electrical path branched from the common path 41. The second branch path 50 includes a second positive-electrode side branch line 50A branched from the positive-electrode side common line 41A, and a second negative-electrode side branch line 50B branched from the negative-electrode side common line 41B.

The transfer unit 51 is connected to the second branch path 50. The transfer unit 51 transfers electric power to and from the high voltage battery 40. Here, the term "transfer" means at least either supply of the electric power with the high-voltage battery 40 to the transfer unit 51 or supply of the electric power with the transfer unit 51 to the high-voltage battery 40. The transfer unit 51 may be, for example, an electric apparatus using V2X (Vehicle to everything) communication. The transfer unit 51 may be an in-vehicle device or an off-vehicle electric device. More specifically, the transfer unit 51 may be an in-vehicle charger (e.g., on-board charger) or an off-vehicle charger (e.g., off-board charger). When the transfer unit 51 is an in-vehicle device, the entire vehicle power supply system 100 is mounted on the vehicle. When the transfer unit 51 is an off-vehicle electric device, components of the vehicle power supply system 100 other than the transfer unit 51 are mounted on the vehicle.

The second capacitor 52 is connected to the second branch path 50 on the side of the high-voltage battery 40 relative to the transfer unit 51. One end of the second capacitor 52 is connected to the second positive-electrode side branch line 50A, and the other end of the second capacitor 52 is connected to the second negative-electrode side branch line 50B. The second capacitor 52 functions as a smoothing capacitor for smoothing the voltage applied to the second branch path 50 between the high-voltage battery 40 and the transfer unit 51.

The low-voltage battery 53 is a battery whose voltage in full charge is lower than a voltage in full charge of the high voltage battery 40. The low-voltage battery 53 may be a lithium ion battery, a lead battery, or other battery. The voltage of the low-voltage battery 53 in full charge may be, for example, 12 V, or other voltage.

The low-voltage load 54 is an in-vehicle electric device. The low voltage load 54 is driven in accordance with electric power from, for example, the low-voltage battery 53. The low-voltage load 54 may include a self starting motor, an alternator, an electric power steering system, an electric parking brake, a lighting, a wiper drive, a navigation system, and the like.

2. Configuration of Vehicle Power Supply Device 10

The vehicle power supply device 10 includes a first positive-electrode side relay 11, a first negative-electrode side relay 12, a second positive-electrode side relay 13, a second negative-electrode side relay 14, a DC-DC converter 15, a pre-charge circuit 16, and a control unit 17.

The first positive-electrode side relay 11 and the first negative-electrode side relay 12 correspond to one example of the first relay. The first positive-electrode side relay 11 is provided on the first positive-electrode side branch line 42A on the side of the high voltage battery 40 relative to the first capacitor 45. The first negative-electrode side relay 12 is provided on the first negative-electrode side branch line 42B on the side of the high-voltage battery 40 relative to the first capacitor 45.

The second positive-electrode side relay 13 and the second negative-electrode side relay 14 correspond to one example of the second relay. The second positive-electrode side relay 13 is provided on the second positive-electrode side branch line 50A on the side of the high-voltage battery 40 relative to the second capacitor 52. The second negative-electrode side relay 14 is provided on the second negative-electrode side branch line 50B on the side of the high-voltage battery 40 relative to the second capacitor 52.

The first positive-electrode side relay 11, the first negative-electrode side relay 12, the second positive-electrode side relay 13, and the second negative-electrode side relay 14 are all mechanical relays and have contacts. The first positive-electrode side relay 11, the first negative-electrode side relay 12, the second positive-electrode side relay 13, and the second negative-electrode side relay 14 are in a state where the contacts are closed when they are in the on-state, and in a state where the contacts are open when they are in the off-state.

An electrical path between the first positive-electrode side relay 11 and the first capacitor 45 in the first branch path 42 (more specifically, first positive-electrode side branch line 42A) is a first positive-electrode side conductive line 61. An electrical path between the first negative electrode side relay 12 and the first capacitor 45 in the first branch path 42 (more specifically, first negative-electrode side branch line 42B) is a first negative-electrode side conductive line 62. The first positive-electrode side conductive line 61 and the first negative-electrode side conductive line 62 correspond to one example of the first conductive path.

An electrical path between the second positive-electrode side relay 13 and the second capacitor 52 in the second branch path 50 (more specifically, second positive-electrode side branch line 50A) is a second positive-electrode side conductive line 63. An electrical path between the second negative electrode side relay 14 and the second capacitor 52 in the second branch path 50 (more specifically, second negative-electrode side branch line 50B) is a second negative-electrode side conductive line 64. The second positive-electrode side conductive line 63 and the second negative-electrode side conductive line 64 correspond to one example of the second conductive path.

The DC-DC converter 15 is provided between the first positive-electrode side conductive line 61 and the first negative-electrode side conductive line 62, and the low-voltage battery 53. The DC-DC converter 15 performs a voltage step-down operation of stepping down a voltage inputted from the first positive-electrode side conductive line 61 and the first negative-electrode side conductive line 62, and outputting the voltage to the low-voltage battery 53. The DC-DC converter 15 also performs a voltage boosting operation of boosting the voltage inputted from the low-voltage battery 53 and outputting the boosted voltage to the first positive-electrode side conductive line 61 and the first negative-electrode side conductive line 62.

The DC-DC converter 15 is provided between the second positive-electrode side conductive line 63 and the second negative-electrode side conductive line 64, and the low-voltage battery 53. The DC-DC converter 15 performs a voltage step-down operation of stepping down a voltage inputted from the second positive-electrode side conductive line 63 and the second negative-electrode side conductive line 64, and outputting the voltage to the low-voltage battery 53. The DC-DC converter 15 also performs a voltage boosting operation of boosting the voltage inputted from the low-voltage battery 53 and outputting the boosted voltage to the second positive-electrode side conductive line 63 and the second negative-electrode side conductive line 64.

In the voltage step-down operation, the DC-DC converter 15 steps down a voltage applied to a positive-electrode high voltage side conductive line 65 (more specifically, between the positive-electrode high-voltage side conductive line 65 and a negative-electrode high-voltage side conductive line 66), and applies the voltage to a positive-electrode low-voltage side conductive line 67 (more specifically, between the positive-electrode low-voltage side conductive line 67 and a negative-electrode low-voltage side conductive line 68).

In the voltage boosting operation, the DC-DC converter 15 boosts a voltage applied to the positive-electrode low-voltage side conductive line 67 (more specifically, between the positive-electrode low-voltage side conductive line 67 and the negative-electrode low-voltage side conductive line 68), and applies the voltage to the positive-electrode high-voltage side conductive line 65 (more specifically, between the positive-electrode high-voltage side conductive line 65 and the negative-electrode high voltage side conductive line 66).

The positive-electrode high voltage side conductive line 65 and the negative-electrode high-voltage side conductive line 66 correspond to one example of the high-voltage side conductive path. The positive-electrode high-voltage side conductive line 65 is connected to the first positive-electrode side conductive line 61 and the second positive-electrode side conductive line 63. The negative-electrode high-voltage side conductive line 66 is connected to the first negative-electrode side conductive line 62 and the second negative-electrode side conductive line 64. The positive-electrode high voltage side conductive line 65 is short-circuited to the first capacitor 45 (more specifically, one end of the first capacitor 45) via the first positive-electrode side conductive line 61, and is short-circuited to the second capacitor 52 (more specifically, one end of the second capacitor 52) via the second positive-electrode side conductive line 63. The negative-electrode high-voltage side conductive line 66 is short-circuited to the first capacitor 45 (more specifically, the other end of the first capacitor 45) via the first negative-electrode side conductive line 62, and is short-circuited to the second capacitor 52 (more specifically, the other end of the second capacitor 52) via the second negative-electrode side conductive line 64. Accordingly, when the DC-DC converter 15 performs the voltage boosting operation, electric power is supplied from the DC-DC converter 15 to the first capacitor 45 and the second capacitor 52. In other words, the DC-DC converter 15 can pre-charge the first capacitor 45 and the second capacitor 52.

The positive-electrode low-voltage side conductive line 67 and the negative-electrode low-voltage side conductive line 68 correspond to one example of the low-voltage side conductive path. The positive electrode of the low-voltage battery 53 and one end of the low-voltage load 54 are connected to the positive-electrode low-voltage side conductive line 67. The negative electrode of the low-voltage battery 53 and the other end of the low-voltage load 54 are connected to the negative-electrode low-voltage side conductive line 68.

The pre-charge circuit 16 has a configuration in which the pre-charge relay 20 and the resistor 21 are connected in series. The pre-charge circuit 16 is provided in parallel with the first positive-electrode side relay 11. The pre-charge circuit 16 is provided in parallel only with the first positive-electrode side relay 11 of the first positive-electrode side relay 11, the first negative electrode side relay 12, the second positive-electrode side relay 13, and the second negative-electrode side relay 14. One end of the pre-charge circuit 16 is short-circuited to the positive electrode of the high-voltage battery 40. The other end of the pre-charge circuit 16 is short-circuited to one end of the first capacitor 45 and is short-circuited to one end of the second capacitor 52. When the pre-charge relay 20 is in the on-state, electric power is supplied with the high-voltage battery 40 to the first capacitor 45 and the second capacitor 52 via the pre-charge circuit 16. That is, when the pre-charge relay 20 is in the on state, the pre-charge circuit 16 pre-charges the first capacitor 45 and the second capacitor 52 in accordance with the electric power from the high-voltage battery 40.

3. Configuration of Control Unit 17

The control unit 17 includes an integrated circuit such as an MCU (Micro Controller Unit). The control unit 17 includes a processing unit such as a CPU and a storage unit such as a ROM and a RAM. The control unit 17 controls the first positive-electrode side relay 11, the first negative-electrode side relay 12, the second positive-electrode side relay 13, the second negative electrode side relay 14, the pre-charge relay 20, and the DC-DC converter 15.

The control unit 17 can pre-charge the first capacitor 45 and the second capacitor 52 with use of the pre-charge circuit 16. The control unit 17 switches the first negative-electrode side relay 12 and the pre-charge relay 20 to the on-state, thereby supplying electric power from the high-voltage battery 40 to the first capacitor 45 and the second capacitor 52 via the pre-charge circuit 16. As a result, the first capacitor 45 and the second capacitor 52 are pre-charged. With this configuration, the voltages of the first capacitor 45 and the second capacitor 52 can more rapidly increase as compared with the case where pre-charge is performed with use of the DC-DC converter 15. In this case, however, the voltages of the first capacitor 45 and the second capacitor 52 decrease in increasing speed as they approach the voltage of the high voltage battery 40. If the first positive electrode side relay 11 is switched to the on state while a potential difference is generated between both ends of the first positive-electrode side relay 11, at least an inrush current flows through the first positive-electrode side relay 11, which may lead to deterioration of the first positive-electrode side relay 11.

The control unit 17 can pre-charge the first capacitor 45 and the second capacitor 52 with use of the DC-DC converter 15. The control unit 17 causes the DC-DC converter 15 to perform a voltage boosting operation, whereby the electric power in accordance is supplied with the low-voltage battery 53 to the first capacitor 45 and the second capacitor 52. As a result, the first capacitor 45 and the second capacitor 52 are pre-charged. With this configuration, the voltages of the first capacitor 45 and the second capacitor 52 can be increased to the same voltage as the voltage of the high voltage battery 40. Therefore, relay deterioration can be easily suppressed when the first positive-electrode side relay 11, the first negative-electrode side relay 12, the second positive-electrode side relay 13, and the second negative-electrode side relay 14 are switched to the on-state.

When the condition for pre-charging the first capacitor 45 is satisfied, the control unit 17 switches the pre-charge relay 20 and the first negative-electrode side relay 12 to the on state, for example, to pre-charge the first capacitor 45. At this time, the second capacitor 52 is also charged. When the voltage of the first capacitor 45 is boosted to a certain level, the control unit 17 switches the first positive-electrode side relay 11 to the on-state and switches the pre-charge relay 20 to the off-state. As a result, electric power is supplied with the high voltage battery 40 to the electric power conversion unit 44. Moreover, the electric power conversion unit 44 performs power conversion operation under control of the control unit 17 or another control device, whereby AC power is generated in the electric power conversion unit 44, and the AC power is supplied to the motor 43. Here, the condition for pre-charging the first capacitor 45 may be, for example, the condition that driving of the motor 43 is started, or the condition that a start switch of the vehicle is switched to the on-state. The control unit 17 receives a signal from an external component that can specify an on-off-state of the start switch, and specifies the on-off-state of the start switch in response to the signal. The start switch is a power switch if the vehicle is an electric vehicle or a fuel cell vehicle, or an ignition switch if the vehicle is a hybrid vehicle. A method for determining that the voltage of the first capacitor 45 has increased to a certain level may be determining that the voltage of the first capacitor 45 has exceeded a predetermined value, determining that a potential difference between both ends of the first positive-electrode side relay 11 has become less than a predetermined value, determining that a value of a current flowing through the pre-charge circuit 16 has become less than a predetermined value, or determining that a predetermined time has elapsed for the pre-charge time. Other approaches may be used as well.

Figure 2:
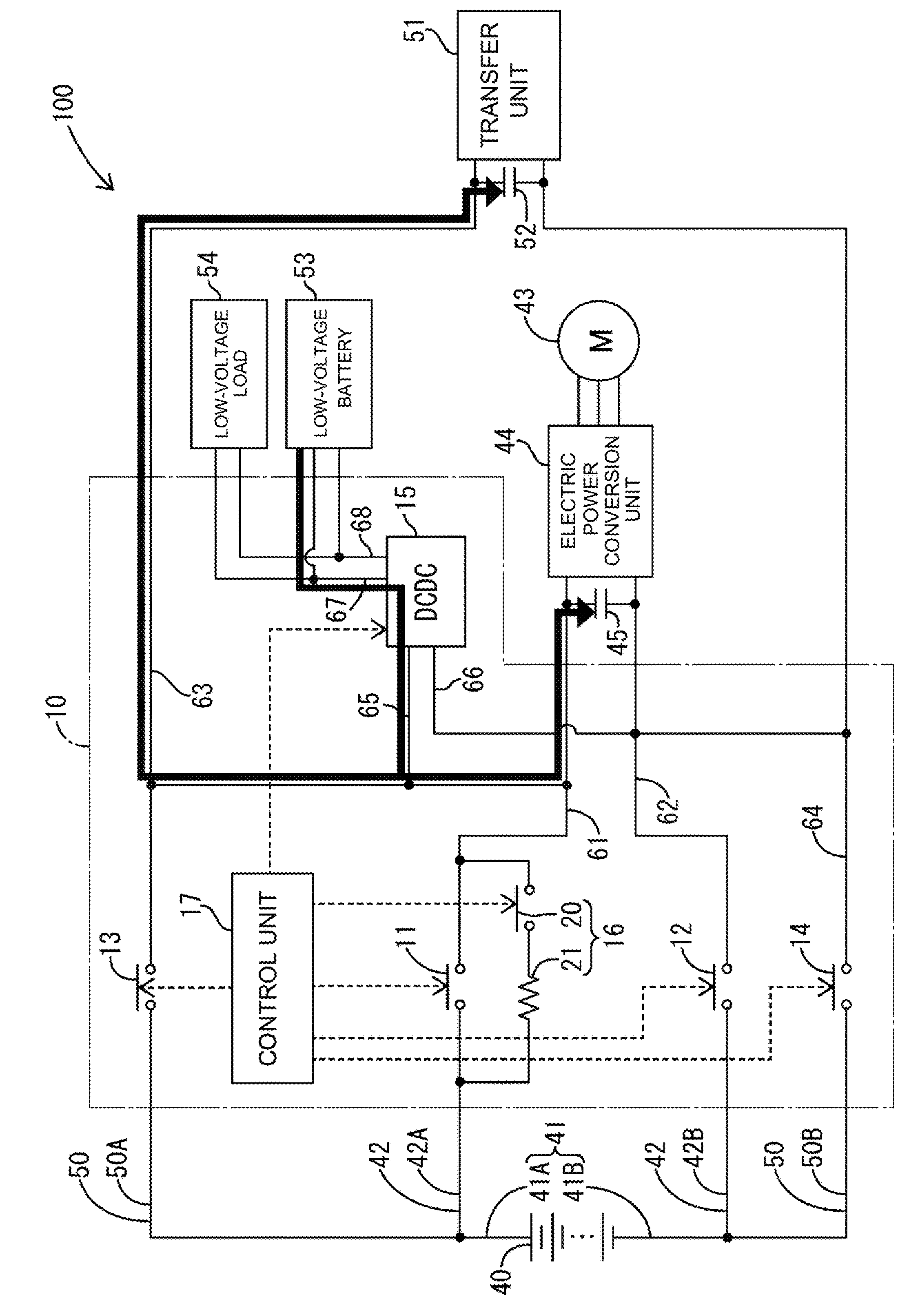
FIG. 2 is an explanatory diagram conceptually showing a state in which electric power is supplied from a DC-DC converter to a first capacitor and a second capacitor in the first embodiment.

When the condition for pre-charging the second capacitor 52 is satisfied, the control unit 17 causes the DC-DC converter 15 to perform the voltage boosting operation, for example, to pre-charge the second capacitor 52 (see FIG. 2). At this time, the first capacitor 45 is also charged. When the voltage of the second capacitor 52 is boosted to a certain level, the control unit 17 switches the second positive-electrode side relay 13 and the second negative-electrode side relay 14 to the on-state. As a result, the high-voltage battery 40 and the transfer unit 51 are brought into conduction, achieving a state in which electric power can be transferred between them. With this configuration, it is possible to transfer electric power between the high voltage battery 40 and the transfer unit 51 without switching the first positive-electrode side relay 11 to the on-state. Therefore, since there is no need to switch the first positive-electrode side relay 11 to the on-state, deterioration of the first positive electrode side relay 11 can be suppressed that is caused by switching the first positive-electrode side relay 11 to the on-state. Here, the condition for pre-charging the second capacitor 52 may be, for example, the condition that the operation of the transfer unit 51 is started, or may be another condition. Moreover, the condition for pre-charging the second capacitor 52 may be the same as or different from the condition for pre-charging the first capacitor 45. As for the method for determining that the voltage of the second capacitor 52 has increased to a certain level, it may be determined that the voltage of the second capacitor 52 has exceeded a predetermined value, it may be determined that a potential difference between both ends of the second positive-electrode side relay 13 or the second negative-electrode side relay 14 has become less than a predetermined value, it may be determined that a value of a current flowing through the second positive-electrode side conductive line 63 has become less than a predetermined value, or it may be determined that a predetermined time has elapsed for the pre-charge time. Other approaches may be used as well.

4. Examples of Effects

In the vehicle power supply device 10, the second positive-electrode side relay 13 and the second negative electrode side relay 14 are switched to the on-state, whereby electric power can be transferred between the high voltage battery 40 and the transfer unit 51 without switching the first positive-electrode side relay 11 to the on-state. This can suppress deterioration of the first positive-electrode side relay 11 caused by switching the first positive-electrode side relay 11 to the on-state. Furthermore, the vehicle power supply device 10 can pre-charge the second capacitor 52 with use of the DC-DC converter 15 for charging the low-voltage battery 53. Accordingly, the vehicle power supply device 10 can suppress an inrush current generated when the second positive-electrode side relay 13 is switched to the on-state, and can suppress the deterioration of the second positive-electrode side relay 13. That is, the vehicle power supply device 10 can easily suppress deterioration of the second positive-electrode side relay 13 provided on the electric power path different from the electric power path to the motor 43 for travelling.

The vehicle power supply device 10 can pre-charge both the first capacitor 45 and the second capacitor 52 simultaneously with use of the DC-DC converter 15 for charging the low-voltage battery 53 when the condition for pre-charging both the first capacitor 45 and the second capacitor 52 is satisfied.

The vehicle power supply device 10 can pre-charge the first capacitor 45 more rapidly compared with pre-charge by the DC-DC converter 15 by switching the pre-charge relay 20 to the on-state. Moreover, the vehicle power supply device 10 can pre-charge the second capacitor 52 with use of the DC-DC converter 15 without providing a pre-charge circuit for the second positive-electrode side relay 13.

Second Embodiment

In the second embodiment, a configuration is to be described in which a flow of a current from a DC-DC converter to a first capacitor can be shut off when a second capacitor is pre-charged with use of the DC-DC converter. Now, the same configurations as those of the first embodiment are denoted by the same reference numerals, and their detailed description will be omitted.

Figure 3:
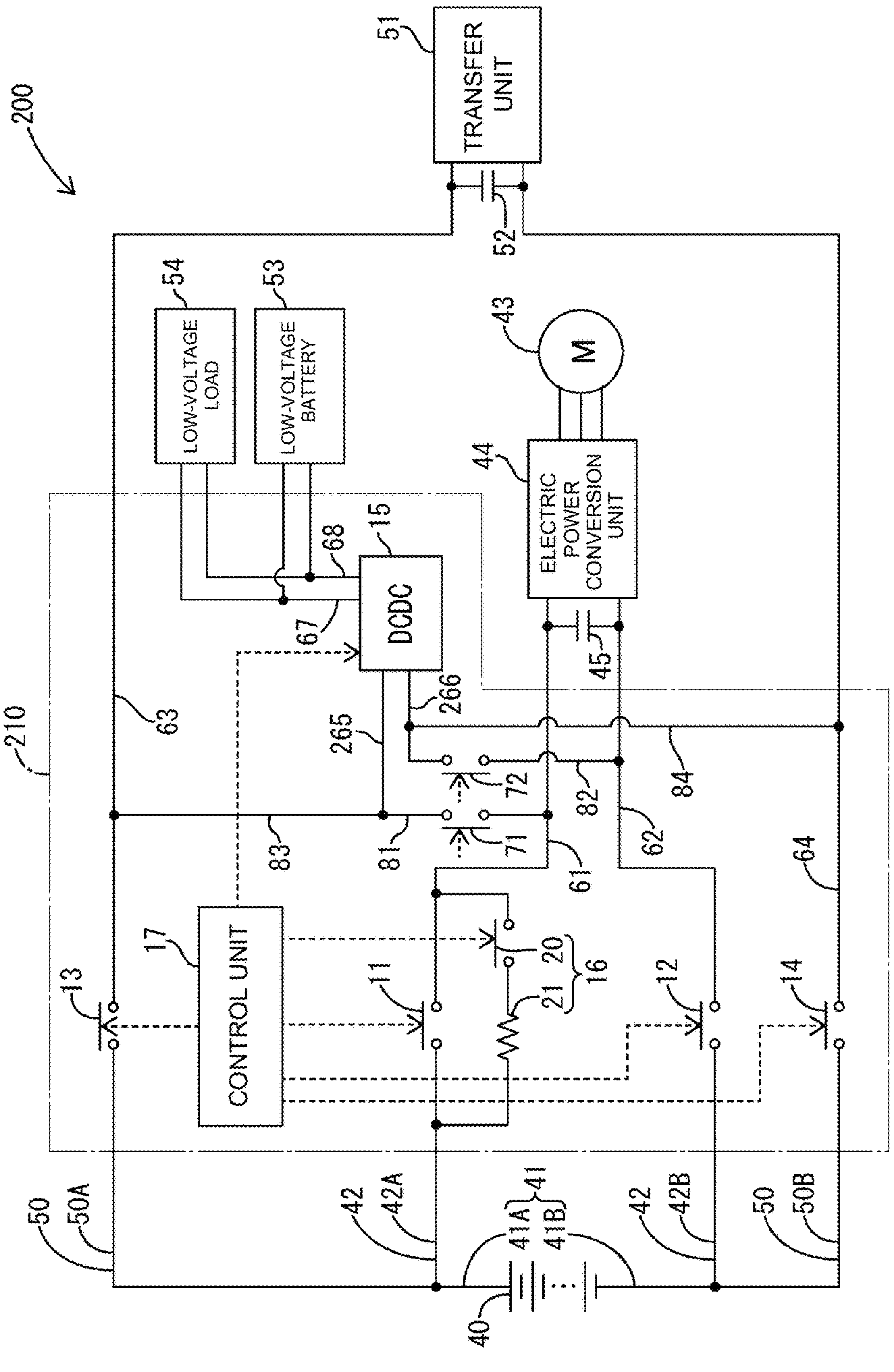
FIG. 3 is a circuit diagram schematically showing a vehicle power supply system including a vehicle power supply device according to a second embodiment.

As shown in FIG. 3, a vehicle power supply device 200 of the second embodiment includes a high-voltage battery 40, a common path 41, a first branch path 42, a motor 43 for travelling, an electric power conversion unit 44, a first capacitor 45, a second branch path 50, a transfer unit 51, a second capacitor 52, a low-voltage battery 53, a low-voltage load 54, and a vehicle power supply device 210.

The vehicle power supply device 210 includes a first positive-electrode side relay 11, a first negative-electrode side relay 12, a second positive-electrode side relay 13, a second negative-electrode side relay 14, a DC-DC converter 15, a pre-charge circuit 16, a control unit 17, a positive-electrode side switch 71, and a negative-electrode side switch 72.

In a voltage step-down operation, the DC-DC converter 15 steps down a voltage applied to a positive-electrode high-voltage side conductive line 265 (more specifically, between the positive-electrode high-voltage side conductive line 265 and a negative-electrode high-voltage side conductive line 266), and applies the voltage to a positive-electrode low-voltage side conductive line 67 (more specifically, between the positive-electrode low-voltage side conductive line 67 and a negative-electrode low-voltage side conductive line 68).

In a voltage boosting operation, the DC-DC converter 15 is boosted the voltage applied to the positive-electrode low-voltage side conductive line 67 (more specifically, between the positive-electrode low-voltage side conductive line 67 and the negative electrode low-voltage side conductive line 68), and applies the voltage to the positive-electrode high-voltage side conductive line 265 (more specifically, between the positive-electrode high voltage side conductive line 265 and the negative-electrode high-voltage side conductive line 266).

The positive-electrode high voltage side conductive line 265 and the negative-electrode high-voltage side conductive line 266 correspond to one example of the high-voltage side conductive path. The positive-electrode high-voltage side conductive line 265 is connected to the first positive-electrode side conductive line 61 via a third positive-electrode side conductive line 81 branched from the positive-electrode high voltage side conductive line 265. The positive-electrode high-voltage side conductive line 265 is connected to the second positive-electrode side conductive line 63 via a fourth positive-electrode side conductive line 83 branched from the positive-electrode high-voltage side conductive line 265. The third positive-electrode side conductive line 81 corresponds to one example of the third conductive path. The fourth positive-electrode side conductive line 83 corresponds to one example of the fourth conductive path. The positive-electrode high-voltage side conductive line 265 is short-circuited to the first capacitor 45 (more specifically, one end of the first capacitor 45) via the third positive-electrode side conductive line 81 and the first positive-electrode side conductive line 61. The positive-electrode high-voltage side conductive line 265 is short-circuited to the second capacitor 52 (more specifically, one end of the second capacitor 52) via the fourth positive-electrode side conductive line 83 and the second positive-electrode side conductive line 63.

The negative-electrode high-voltage side conductive line 266 is connected to the first negative-electrode side conductive line 62 via a third negative-electrode side conductive line 82 branched from the negative-electrode high-voltage side conductive line 266. The negative-electrode high voltage side conductive line 266 is connected to the second negative-electrode side conductive line 64 via a fourth negative-electrode side conductive line 84 branched from the negative-electrode high-voltage side conductive line 266. The third negative-electrode side conductive line 82 corresponds to one example of the third conductive path. The fourth negative-electrode side conductive line 84 corresponds to one example of the fourth conductive path. The negative-electrode high-voltage side conductive line 266 is short-circuited to the first capacitor 45 (more specifically, the other end of the first capacitor 45) via the third negative-electrode side conductive line 82 and the first negative-electrode side conductive line 62. The negative-electrode high voltage side conductive line 266 is short-circuited to the second capacitor 52 (more specifically, the other end of the second capacitor 52) via the fourth negative-electrode side conductive line 84 and the second negative-electrode side conductive line 64.

The positive-electrode side switch 71 and the negative-electrode side switch 72 correspond to one example of the switch. The positive-electrode side switch 71 is provided on the third positive-electrode side conductive line 81. The negative-electrode side switch 72 is provided on the third negative electrode side conductive line 82. The positive-electrode side switch 71 and the negative-electrode side switch 72 may each include a mechanical switch having a contact, or may include a semi-conductor switch. The positive-electrode side switch 71 and the negative-electrode side switch 72 each allow a bi-directional flow of a current when they are in the on-state, and shut-off the bi-directional flow of the current when they are in the off-state.

When the DC-DC converter 15 performs the voltage boosting operation while both the positive-electrode side switch 71 and the negative-electrode side switch 72 are in the on-state, electric power is supplied from the DC-DC converter 15 to the first capacitor 45 and the second capacitor 52. That is, the DC-DC converter 15 can pre-charge the first capacitor 45 and the second capacitor 52 simultaneously.

When the DC-DC converter 15 performs the voltage boosting operation while the positive-electrode side switch 71 and the negative-electrode side switch 72 are in the off-state, electric power is supplied from the DC-DC converter 15 to the second capacitor 52. That is, the DC-DC converter 15 can pre-charge only the second capacitor 52 out of the first capacitor 45 and the second capacitor 52.

The control unit 17 controls the positive-electrode side switch 71 and the negative-electrode side switch 72. When a condition for charging the low-voltage battery 53 is satisfied, the control unit 17 causes the DC-DC converter 15 to perform the voltage step-down operation while controlling the first positive-electrode side relay 11, the first negative-electrode side relay 12, the positive-electrode side switch 71, and the negative-electrode side switch 72 to be in the on-state, for example, thereby charging the low voltage battery 53 in accordance with electric power of the high-voltage battery 40.

The control unit 17 causes the DC-DC converter 15 to perform the voltage boosting operation while controlling the positive-electrode side switch 71 and the negative-electrode side switch 72 to be in the on-state, for example, thereby achieving power supply from the DC-DC converter 15 to the first capacitor 45 and the second capacitor 52. As a result, both the first capacitor 45 and the second capacitor 52 are pre-charged simultaneously. When the voltages of the first capacitor 45 and the second capacitor 52 boost to a certain level, for example, the control unit 17 switches the first positive-electrode side relay 11, the first negative-electrode side relay 12, the second positive-electrode side relay 13, and the second negative-electrode side relay 14 to the on state. As a result, the electric power is supplied with the high voltage battery 40 to the electric power conversion unit 44 via the first branch path 42, and the high voltage battery 40 and the transfer unit 51 can transfer electric power with each other. As for the method for determining that the voltages of the first capacitor 45 and the second capacitor 52 has increased to the certain level, it may be determined that the voltage of the second capacitor 52 has exceeded a predetermined value, it may be determined that a potential difference between both ends of the second positive-electrode side relay 13 or the second negative-electrode side relay 14 has become less than a predetermined value, it may be determined that a value of a current flowing through the second positive-electrode side conductive line 63 has become less than a predetermined value, or it may be determined that a predetermined time has elapsed for the pre-charge time. Other approaches may be used as well.

Figure 4:
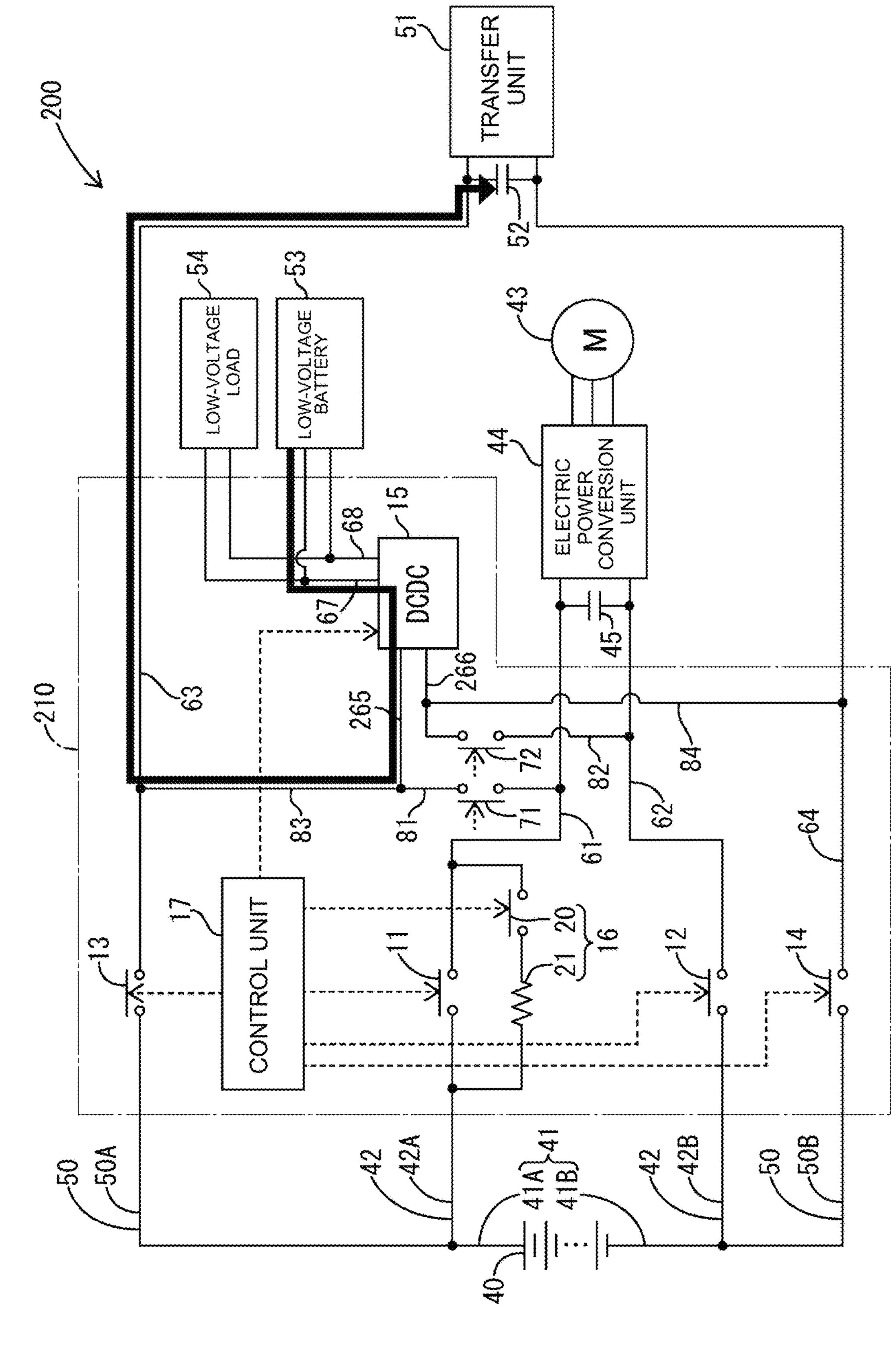
FIG. 4 is an explanatory diagram conceptually showing a state in which electric power is supplied from a DC-DC converter to a second capacitor in the second embodiment.

When the condition for pre-charging the second capacitor 52 is satisfied, the control unit 17 causes the DC-DC converter 15 to perform the voltage boosting operation while controlling, for example, the positive-electrode side switch 71 and the negative-electrode side switch 72 to be in the off-state, thereby causing the DC-DC converter 15 to supply electric power to the second capacitor 52, as shown in FIG. 4. As a result, only the second capacitor 52 out of the first capacitor 45 and the second capacitor 52 is pre-charged. When the voltage of the second capacitor 52 is boosted to a certain level, the control unit 17 switches the second positive-electrode side relay 13 the second negative-electrode side relay 14 to the on state. As a result, the high-voltage battery 40 and the transfer unit 51 are brought into conduction, achieving a state in which electric power can be transferred between them. With this configuration, it is possible to transfer electric power between the high-voltage battery 40 and the transfer unit 51 without switching the first positive-electrode side relay 11 to the on-state. This can suppress the deterioration of the first positive-electrode side relay 11 caused by switching the first positive-electrode side relay 11 to the on-state.

As described above, the vehicle power supply device 210 of the second embodiment can supply electric power from the high-voltage battery 40 to the low-voltage battery 53 via the third positive-electrode side conductive line 81 and the DC-DC converter 15 when the positive-electrode side switch 71 and the negative-electrode side switch 72 are in the on-state. Moreover, the vehicle power supply device 210 can prevent supply of electric power from the DC-DC converter 15 to the first positive-electrode side conductive line 61 by keeping the positive-electrode side switch 71 and the negative-electrode side switch 72 in the off-state when electric power is supplied from the DC-DC converter 15 to the second capacitor 52 via the fourth positive-electrode side conductive line 83. Accordingly, the vehicle power supply device 210 can prevent consumption of electric power from the DC-DC converter 15 by the first capacitor 45 when the second capacitor 52 is pre-charged, and can avoid leading to a delay in a charging speed of the second capacitor 52.

Third Embodiment

In the third embodiment, a configuration is to be described that can perform pre-charging on a first capacitor and a second capacitor selectively with use of a DC-DC converter. Now, the same configurations as those of the second embodiment are denoted by the same reference numerals, and their detailed description will be omitted.

Figure 5:
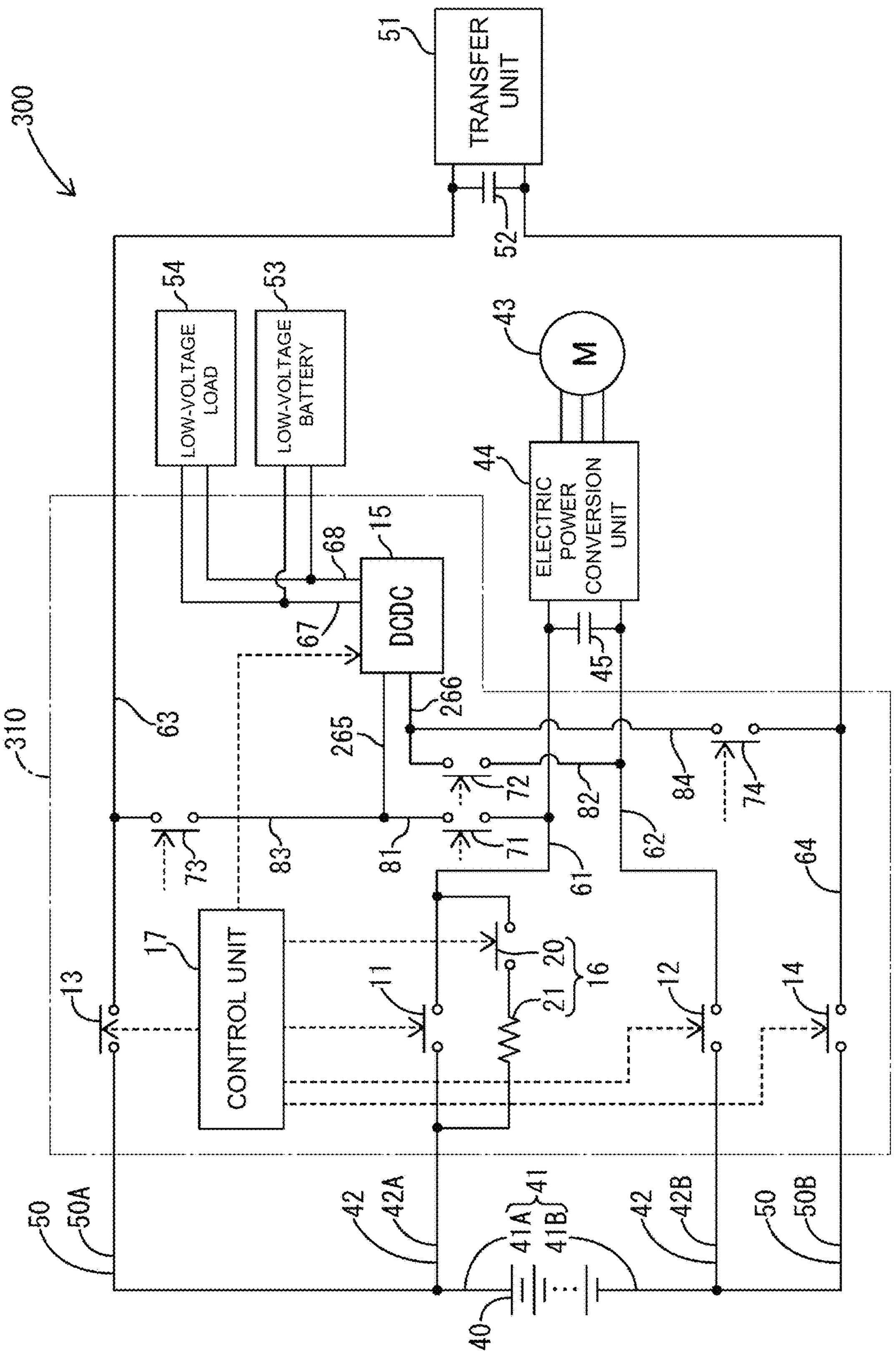
FIG. 5 is a circuit diagram schematically showing a vehicle power supply system including a vehicle power supply device according to a third embodiment.

As shown in FIG. 5, a vehicle power supply system 300 of the third embodiment includes a high-voltage battery 40, a common path 41, a first branch path 42, a motor 43 for travelling, an electric power conversion unit 44, a first capacitor 45, a second branch path 50, a transfer unit 51, a second capacitor 52, a low-voltage battery 53, a low-voltage load 54, and a vehicle power supply device 310.

The vehicle power supply device 310 includes a first positive-electrode side relay 11, a first negative-electrode side relay 12, a second positive-electrode side relay 13, a second negative-electrode side relay 14, a DC-DC converter 15, a pre-charge circuit 16, a control unit 17, a positive-electrode side switch 71, a negative-electrode side switch 72, a second positive-electrode side switch 73, and a second negative-electrode side switch 74.

The second positive-electrode side switch 73 and the second negative-electrode side switch 74 correspond to one example of the second switch. The second positive electrode side switch 73 is provided on a fourth positive-electrode side conductive line 83. The second negative-electrode side switch 74 is provided on a fourth negative-electrode side conductive line 84. The second positive-electrode side switch 73 and the second negative-electrode side switch 74 may each include a mechanical switch having a contact, or may include a semi-conductor switch. The second positive-electrode side switch 73 and the second negative-electrode side switch 74 each allow a bi-directional flow of a current when they are each in the on-state, and shut off the bi-directional flow of the current when they are each in the off-state.

Figure 6:
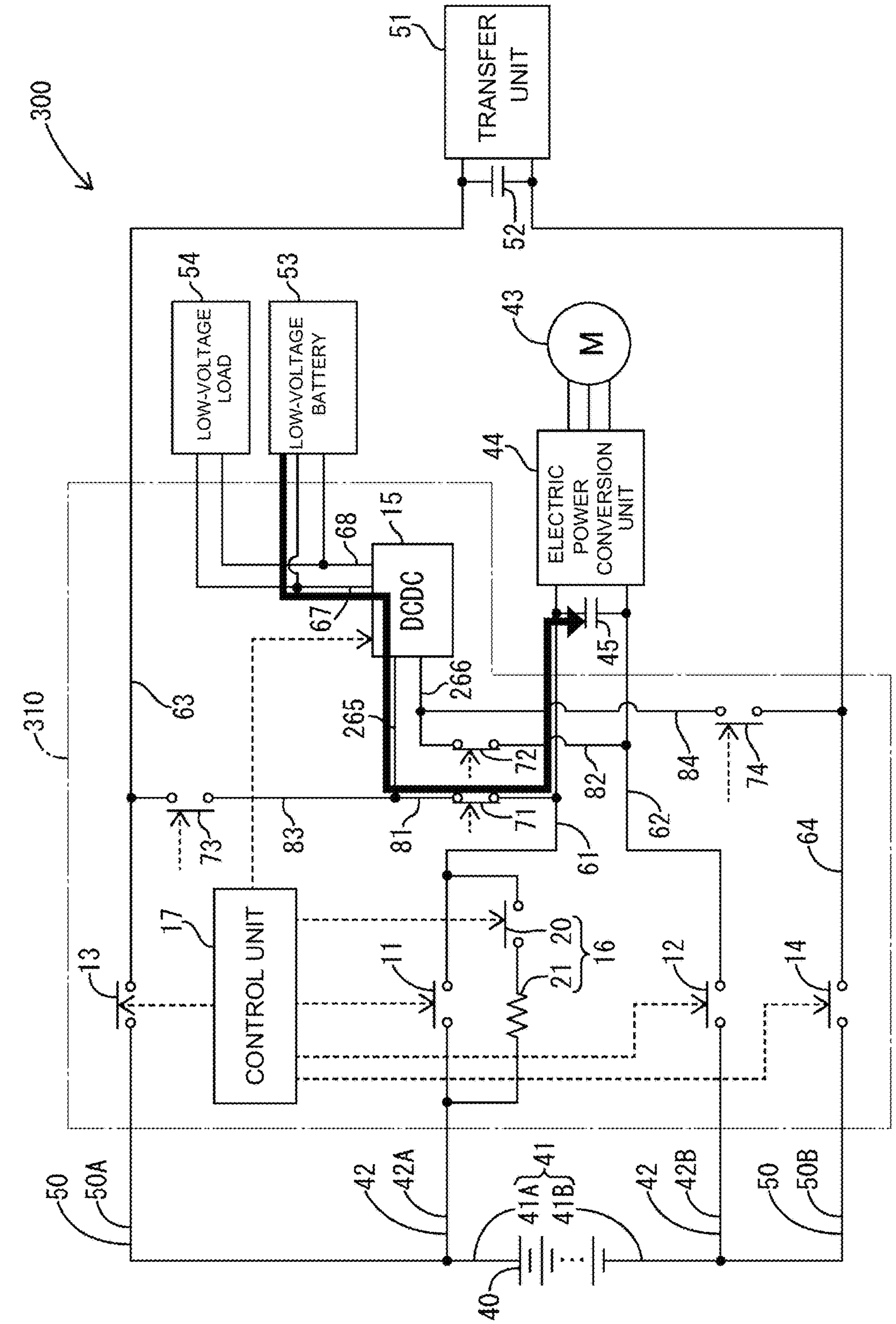
FIG. 6 is an explanatory diagram conceptually showing a state in which electric power is supplied from a DC-DC converter to a first capacitor in the third embodiment.

When the DC-DC converter 15 performs the voltage boosting operation while both the positive-electrode side switch 71 and the negative-electrode side switch 72 are in the on-state and the second positive-electrode side switch 73 and the second negative-electrode side switch 74 are in the off-state, electric power is supplied from the DC-DC converter 15 only to the first capacitor 45 out of the first capacitor 45 and the second capacitor 52, as shown in FIG. 6.

Figure 7:
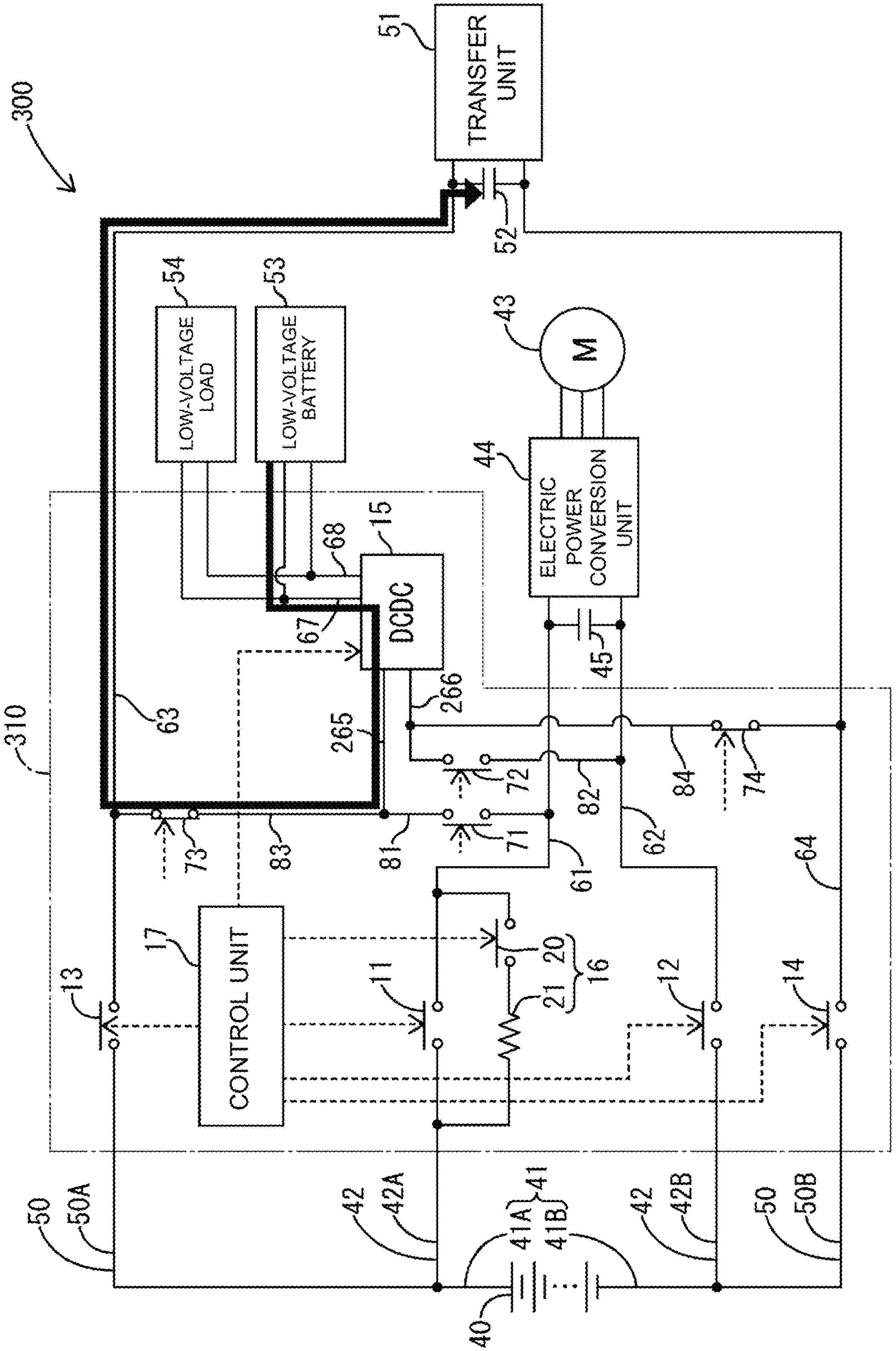
FIG. 7 is an explanatory diagram conceptually showing a state in which electric power is supplied from the DC-DC converter to a second capacitor in the third embodiment.

When the DC-DC converter 15 performs the voltage boosting operation while both the positive-electrode side switch 71 and the negative-electrode side switch 72 are in the off-state and the second positive-electrode side switch 73 and the second negative-electrode side switch 74 are in the on-state, electric power is supplied from the DC-DC converter 15 only to the second capacitor 52 out of the first capacitor 45 and the second capacitor 52, as shown in FIG. 7.

The control unit 17 controls the second positive electrode side switch 73 and the second negative-electrode side switch 74. When the condition for pre-charging the first capacitor 45 is satisfied, the control unit 17 performs first control of controlling the positive-electrode side switch 71 and the negative-electrode side switch 72 to an on-state and controlling the second positive-electrode side switch 73 and the second negative-electrode side switch 74 to an off-state. As a result, electric power from the DC-DC converter 15 is supplied only to the first capacitor 45 out of the first capacitor 45 and the second capacitor 52. That is, only the first capacitor 45 out of the first capacitor 45 and the second capacitor 52 is pre-charged.

When the condition for pre-charging the second capacitor 52 is satisfied, the control unit 17 performs second control of controlling the positive-electrode side switch 71 and the negative-electrode side switch 72 to an off-state and controlling the second positive-electrode side switch 73 and the second negative-electrode side switch 74 to an on-state. As a result, electric power from the DC-DC converter 15 is supplied only to the second capacitor 52 out of the first capacitor 45 and the second capacitor 52. That is, only the second capacitor 52 out of the first capacitor 45 and the second capacitor 52 is pre-charged.

The control unit 17 performs the first control to pre-charge the first capacitor 45 when the condition for pre-charging both the first capacitor 45 and the second capacitor 52 is satisfied. After the first capacitor 45 is pre-charged, the control unit 17 switches the first positive electrode side relay 11 and the first negative-electrode side relay 12 to the on state. For example, when the voltage of the first capacitor 45 is boosted to a certain level, the control unit 17 switches the first positive-electrode side relay 11 the first negative-electrode side relay 12 to the on-state. After switching the first positive-electrode side relay 11 and the first negative-electrode side relay 12 to the on-state, the control unit 17 performs the second control to pre-charge the second capacitor 52. After the second capacitor 52 is pre-charged, the control unit 17 switches the second positive-electrode side relay 13 and the second negative-electrode side relay 14 to the on state. For example, when the voltage of the second capacitor 52 is boosted to a certain level, the control unit 17 switches the second positive-electrode side relay 13 and the second negative-electrode side relay 14 to the on-state. Here, the condition for pre-charging both the first capacitor 45 and the second capacitor 52 may be, for example, one that a start switch of the vehicle is switched to the on-state, or may be another condition.

As described above, the vehicle power supply device 310 in the third embodiment can supply electric power from the DC-DC converter 15 to the first capacitor 45 or the second capacitor 52 selectively. That is, the vehicle power supply device 310 can selectively pre-charge either the first capacitor 45 or the second capacitor 52 in accordance with the electric power from the DC-DC converter 15.

Moreover, the vehicle power supply device 310 can give priority to pre-charging of the first capacitor 45 when the condition for pre-charging both the first capacitor 45 and the second capacitor 52 is satisfied. Accordingly, the vehicle power supply device 310 can easily start electric power supply via the first branch path 42 earlier, and thus can also easily start driving of the motor 43 earlier.

Other Embodiments

The present disclosure is not limited to the embodiments described above with reference to the description and drawings. For example, the features of the embodiments described above or below can be combined in any combination within a consistent range. Also, any of the features of the embodiments described above or below may be omitted unless it is clearly stated as essential. Furthermore, the embodiments described above may be modified as follows.

In the third embodiment described above, when the condition for pre-charging both the first capacitor 45 and the second capacitor 52 is satisfied, the control unit 17 may cause the DC-DC converter 15 to perform the voltage boosting operation to pre-charge both the first capacitor 45 and the second capacitor 52 simultaneously. That is, the control unit 17 may control the positive-electrode side switch 71, the negative-electrode side switch 72, the second positive-electrode side switch 73, and the second negative-electrode side switch 74 so as to pre-charge both the first capacitor 45 and the second capacitor 52 simultaneously in accordance with electric power from the DC-DC converter 15.

In the embodiments described above, there is no need to provide the pre-charge circuit 16. Also in this case, the first capacitor 45 and the second capacitor 52 can be pre-charged with use of the DC-DC converter 15.

It should be noted that the embodiments disclosed this time are exemplary in all respects and are not restrictive. The scope of the present invention is not limited to the embodiments disclosed here, but is intended to include all modifications within the scope indicated by the claims or within the scope equivalent to the claims.

LIST OF REFERENCE NUMERALS

10 Vehicle power supply device
11 First positive-electrode side relay (First relay)
12 First negative-electrode side relay (First relay)
13 Second positive-electrode side relay (Second relay)
14 Second negative-electrode side relay (Second relay)

15 DC-DC converter
16 Pre-charge circuit
17 Control unit
20 Pre-charge relay
21 Resistor
40 High-voltage battery
41 Common path
41A Positive-electrode side common line
41B Negative-electrode side common line
42 First branch path
42A First positive-electrode side branch line
42B First negative-electrode side branch line
43 Motor
44 Electric power conversion unit
45 First capacitor
50 Second branch path
50A Second positive-electrode side branch line
50B Second negative-electrode side branch line
51 Transfer unit
52 Second capacitor
53 Low-voltage battery
54 Low-voltage load
61 First positive-electrode side conductive line (First conductive path)
62 First negative-electrode side conductive line (First conductive path)
63 Second positive-electrode side conductive line (Second conductive path)
64 Second negative-electrode side conductive line (Second conductive path)
65 Positive-electrode high voltage side conductive line (High-voltage side conductive path)
66 Negative-electrode high-voltage side conductive line (High-voltage side conductive path)
67 Positive-electrode low-voltage side conductive line (Low-voltage side conductive path)
68 Negative-electrode low-voltage side conductive line (Low-voltage side conductive path)
71 Positive-electrode side switch (Switch)
72 Negative-electrode side switch (Switch)
73 Second positive-electrode side switch (Second switch)
74 Second negative-electrode side switch (Second switch)
81 Third positive-electrode side conductive line (Third conductive path)
82 Third negative-electrode side conductive line (Third conductive path)
83 Fourth positive-electrode side conductive line (Fourth conductive path)
84 Fourth negative-electrode side conductive line (Fourth conductive path)
100 Vehicle power supply system
200 Vehicle power supply device
210 Vehicle power supply device
265 Positive-electrode high-voltage side conductive line (High-voltage side conductive path)
266 Negative-electrode high-voltage side conductive line (High-voltage side conductive path)
310 Vehicle power supply device

The invention claimed is:

1. A vehicle power supply device to be used in a vehicle power supply system comprising: a high-voltage battery; a common path through which electric power is supplied from the high-voltage battery; a first branch path that branches from the common path; a motor for travelling to which electric power is supplied with the high-voltage battery via the first branch path; an electric power conversion unit connected to the first branch path and converting electric power between the high-voltage battery and the motor; a first capacitor connected to the first branch path on a side of the high-voltage battery relative to the electric power conversion unit; a second branch path that branches from the common path; a transfer unit connected to the second branch path and configured to transfer electric power to and from the high-voltage battery; a second capacitor connected to the second branch path on the side of the high-voltage battery relative to the transfer unit; and a low-voltage battery, the vehicle power supply device comprising:

a first relay provided in the first branch path on the side of the high-voltage battery relative to the first capacitor;

a second relay provided in the second branch path on the side of the high-voltage battery relative to the second capacitor; and a DC-DC converter, wherein the DC-DC converter is provided between a first conductive path, which is an electrical path between the first relay and the first capacitor in the first branch path, and the low-voltage battery, is configured to step down a voltage inputted from the first conductive path and to output the voltage to the low-voltage battery, is provided between a second conductive path, which is an electrical path between the second relay and the second capacitor in the second branch path, and the low-voltage battery, and is configured to supply electric power to the second capacitor by performing a voltage boosting operation of boosting the voltage inputted from the low-voltage battery, wherein the DC-DC converter is configured to apply voltage, boosted in the voltage boosting operation, to a high-voltage side conductive path, and the high-voltage side conductive path is connected to the first conductive path via a third conductive path and is connected to the second conductive path via a fourth conductive path, and the vehicle power supply device further comprises a first switch provided on the third conductive path and a second switch provided on the fourth conductive path, wherein when the DC-DC converter performs the voltage boosting operation while the first switch is in an on-state and the second switch is in an off-state, electric power from the DC-DC converter is supplied only to the first capacitor out of the first capacitor and the second capacitor, and when the DC-DC converter performs the voltage boosting operation while the first switch is in an off-state and the second switch is in an on-state, electric power from the DC-DC converter is supplied only to the second capacitor out of the first capacitor and the second capacitor.

2. The vehicle power supply device according to claim 1, further comprising:

a control unit configured to control the first relay, the second relay, the first switch, the second switch, and the DC-DC converter, wherein when a condition for pre-charging both the first capacitor and the second capacitor is satisfied, the control unit causes the DC-DC converter to perform the voltage boosting operation while controlling the first switch to be in the on-state and controlling the second switch to be in the off-state, thereby pre-charging the first capacitor, causes the DC-DC converter to perform the voltage boosting operation by switching the first relay to an on-state after pre-charging the first capacitor and switching the second switch to the on-state after switching the first relay to the on-state, thereby pre-charging the second capacitor, and then switches the second relay to an on-state after the second capacitor is pre-charged.

3. A vehicle power supply device to be used in a vehicle power supply system comprising: a high-voltage battery; a common path through which electric power is supplied from the high-voltage battery; a first branch path that branches from the common path; a motor for travelling to which electric power is supplied with the high-voltage battery via the first branch path; an electric power conversion unit connected to the first branch path and converting electric power between the high-voltage battery and the motor; a first capacitor connected to the first branch path on a side of the high-voltage battery relative to the electric power conversion unit; a second branch path that branches from the common path; a transfer unit connected to the second branch path and configured to transfer electric power to and from the high-voltage battery; a second capacitor connected to the second branch path on the side of the high-voltage battery relative to the transfer unit; and a low-voltage battery, the vehicle power supply device comprising:

a first relay provided in the first branch path on the side of the high-voltage battery relative to the first capacitor;

a second relay provided in the second branch path on the side of the high-voltage battery relative to the second capacitor; and a DC-DC converter, wherein the DC-DC converter is provided between a first conductive path, which is an electrical path between the first relay and the first capacitor in the first branch path, and the low-voltage battery, is configured to step down a voltage inputted from the first conductive path and to output the voltage to the low-voltage battery, is provided between a second conductive path, which is an electrical path between the second relay and the second capacitor in the second branch path, and the low-voltage battery, and is configured to supply electric power to the second capacitor by performing a voltage boosting operation of boosting the voltage inputted from the low-voltage battery, further comprising a control unit configured to control the DC-DC converter, wherein when a condition for pre-charging both the first capacitor and the second capacitor is satisfied, the control unit causes the DC-DC converter to perform the voltage boosting operation to pre-charge both the first capacitor and the second capacitor simultaneously.

4. A vehicle power supply device to be used in a vehicle power supply system comprising: a high-voltage battery; a common path through which electric power is supplied from the high-voltage battery; a first branch path that branches from the common path; a motor for travelling to which electric power is supplied with the high-voltage battery via the first branch path; an electric power conversion unit connected to the first branch path and converting electric power between the high-voltage battery and the motor; a first capacitor connected to the first branch path on a side of the high-voltage battery relative to the electric power conversion unit; a second branch path that branches from the common path; a transfer unit connected to the second branch path and configured to transfer electric power to and from the high-voltage battery; a second capacitor connected to the second branch path on the side of the high-voltage battery relative to the transfer unit; and a low-voltage battery, the vehicle power supply device comprising:

a first relay provided in the first branch path on the side of the high-voltage battery relative to the first capacitor;

a second relay provided in the second branch path on the side of the high-voltage battery relative to the second capacitor; and a DC-DC converter, wherein the DC-DC converter is provided between a first conductive path, which is an electrical path between the first relay and the first capacitor in the first branch path, and the low-voltage battery, is configured to step down a voltage inputted from the first conductive path and to output the voltage to the low-voltage battery, is provided between a second conductive path, which is an electrical path between the second relay and the second capacitor in the second branch path, and the low-voltage battery, and is configured to supply electric power to the second capacitor by performing a voltage boosting operation of boosting the voltage inputted from the low-voltage battery, further comprising a pre-charge circuit having an arrangement in which a pre-charge relay and a resistor are connected in series, wherein the pre-charge circuit is provided in parallel only with the first relay out of the first relay and the second relay, and pre-charges the first capacitor in accordance with electric power from the high-voltage battery when the pre-charge relay is in an on-state.

* * * * *